United States Patent [19]
Odnert et al.

[11] Patent Number: 5,555,417
[45] Date of Patent: * Sep. 10, 1996

[54] METHOD AND APPARATUS FOR COMPILING COMPUTER PROGRAMS WITH INTERPROCEDURAL REGISTER ALLOCATION

[75] Inventors: Daryl Odnert, Boulder Creek; Vatsa Santhanam, Sunnyvale, both of Calif.

[73] Assignee: Hewlett-Packard Company, Palo Alto, Calif.

[ * ] Notice: The term of this patent shall not extend beyond the expiration date of Pat. No. 5,428,793.

[21] Appl. No.: 313,432

[22] Filed: Jan. 23, 1995

Related U.S. Application Data

[63] Continuation of Ser. No. 435,914, Nov. 13, 1989, Pat. No. 5,428,793.
[51] Int. Cl.⁶ .................................. G06F 9/44; G06F 9/45
[52] U.S. Cl. ................. 395/700; 364/232.23; 364/280.4; 364/280.5; 364/DIG. 1
[58] Field of Search ..................................... 395/375, 700, 395/800; 364/232.23, 280.4, 280.5

[56] References Cited

U.S. PATENT DOCUMENTS

| | | | |
|---|---|---|---|
| 4,571,678 | 2/1986 | Chaitin | 364/200 |
| 4,642,764 | 2/1987 | Auslander et al. | 364/200 |
| 4,656,582 | 4/1987 | Chaitin et al. | 364/200 |
| 4,777,588 | 10/1988 | Case et al. | 364/200 |
| 4,782,444 | 11/1988 | Munshi et al. | 364/200 |
| 4,961,141 | 10/1990 | Hopkins et al. | 364/200 |
| 5,083,263 | 1/1992 | Joy et al. | 395/425 |
| 5,161,216 | 11/1992 | Reps et al. | 395/375 |
| 5,428,793 | 6/1995 | Odnert et al. | 395/700 |

OTHER PUBLICATIONS

David W. Wall, "Global Register Allocation at Link Time", Digital Equipment Corp., Western Research Lab, ACM, 1986, pp. 264-275.

*Primary Examiner*—Kevin A. Kriess
*Assistant Examiner*—Dennis M. Butler

[57] ABSTRACT

Optimization techniques are implemented by means of a program analyzer used in connection with a program compiler to optimize usage of limited register resources in a computer processor. The first optimization technique, called interprocedural global variable promotion allows the global variables of a program to be accessed in common registers across a plurality of procedures. Moreover, a single common register can be used for different global variables in distinct regions of a program call graph. This is realized by identifying subgraphs, of the program call graph, called webs, where the variable is used. The second optimization technique, called spill code motion, involves the identification of regions of the call graph, called clusters, that facilitate the movement of spill instructions to procedures which are executed relatively less often. This decreases the overhead of register saves and restores which must be executed for procedure calls.

20 Claims, 7 Drawing Sheets

| VARIABLE NAME | PROCEDURES THAT ACCESS VARIABLE |
|---|---|
| g1 | B D E |
| g2 | C E F G |
| g3 | A B C |

METHOD AND APPARATUS FOR COMPILING COMPUTER PROGRAMS WITH INTERPROCEDURAL REGISTER ALLOCATION

This is a continuation of application Ser. No. 07/435,914 filed on Nov. 13, 1989, now U.S. Pat. No. 5,428,793.

COPYRIGHT NOTICE

A portion of the disclosure of this patent document contains material to which a claim of copyright protection is made. The owner has no objection to the facsimile reproduction of the patent document or patent disclosure as it appears in the Patent and Trademark Office patent file or records, but reserves all other rights whatsoever.

BACKGROUND OF THE INVENTION

This invention relates to computer program compilers and more particularly a computer program compilation system that supports register allocation across procedure and compilation unit boundaries where there are global variables and a limited number of registers for storage and manipulation of data.

In a traditional compiler, register allocation is performed on each procedure one at a time. In some compilers, the register allocator has access to register allocation information from other procedures within the same compilation unit. The compiler can use this information to improve the register allocation in the callers of these routines. This type of technique is limited in scope to the procedures of a single compilation unit.

The traditional intraprocedural register allocation process is effective, but in the absence of interprocedural information the following situations occur:
- Local values in different procedures are assigned to the same register. As a result, procedures must execute code to save and restore these registers in order to preserve the values needed by the calling procedure.
- Global variables are referenced out of different registers in different procedures. This requires a modified value of a global variable to be stored to memory before any procedure call, and loaded back from memory before any subsequent use of that variable. This also requires each procedure which references that variable to load the variable from memory if it is used before being redefined, and to store the global variable to memory before the exit point if the variable is modified within that procedure.

For most programming languages, improving this situation is complicated by the need to support multiple compilation units. For example, if one wishes to keep a certain global variable in a register when compiling module A, one must ensure that any reference to that variable in a different module uses the same register.

One possible solution is to delay register assignment until link time, when the code for the entire application is visible. This solution is difficult to implement with traditional compiler architectures, however, because of the need for dataflow and live range information at register allocation time. Moreover, computing this information would create an unreasonable delay each time a user needed to re-link an application.

There are two known significant research efforts that have addressed the weaknesses of procedure-at-a-time register allocation. The first was carried out at DEC's Western Research Lab in 1986 and described by David W. Wall in an article entitled "Global Register Allocation At Link Time" in the Proceedings of the SIGPLAN '86 Symposium On Compiler Construction, SIGPLAN Notices, Vol. 21, No. 7, July 1986, pages 264–275. In this technique, the compiler does a simple register allocation on each procedure and generates register relocation information for the linker. The user may optionally enable interprocedural register allocation at link time. To promote a variable to a register, the linker only needs to follow the prescribed relocation actions. This technique showed some good results. Some benchmarks improved by as much as 8% on a 64-register RISC machine, with a majority of the benefit attributed to the promotion of global variables.

Global variable promotion is an optimization technique where memory references to global variables are converted into register references. In effect, the global variable is promoted from being a memory object to a register object. Traditional compilers sometimes promote global variables to registers locally within a procedure. Such locally promoted global variables are still accessed out of memory across procedures. Before procedure calls and at the exit point, the compiler inserts instructions to store the register containing the promoted global variable back to memory. Similarly, just after procedure returns and at the entry point, the optimizer inserts instructions to load the promoted global variable from memory to register.

The second significant research effort was produced at MIPS Computer Systems and described by Fred C. Chow in "Minimizing Register Usage Penalty at Procedure Calls" published in Proceedings of the SIGPLAN '88 Conference on Programming Language Design and Implementation, July 1988, pages 85–94 and also in an article authored with others in "Cross-Module Optimizations: Its Implementation and Benefits" published in the Proceedings of the Summer 1987 USENIX Conference, pages 347–356. In the MIPS system, the multiple compilation unit problem is solved by exposing an intermediate code representation to the user. Then, instead of linking object code, the user must link the intermediate code files into a single, large intermediate program file. The intermediate code linker then completes the code generation and optimization process. As part of this process, the optimizer tries to minimize register spill by performing register allocation on procedures in a reverse hierarchical order and propagating register usage information upwards in the call graph. This technique showed generally positive results, although there were exceptions noted. In one example discussed, this process resulted in object code which executed more slowly than a version compiled without interprocedural register allocation. There are other computer systems and compilers that have been implemented which use a similar technique within a single compilation unit.

On many contemporary computer architectures, machine registers are divided by software conventions into three classes: status registers, caller-saves registers, and callee-saves registers.
- Status registers are registers which are designated to hold specific values which may not be used to hold variables or other temporary values. Examples include a stack pointer and a global data pointer.
- Caller-saves registers are registers which may be used within a procedure to hold values, but these values are not guaranteed to remain unchanged after executing a call to another procedure. These registers may be used by a procedure without being preserved in memory before they are used. The name "caller-saves" refers to the fact that the caller of a procedure must save any needed values in these registers so the called routine may use those registers.

• Callee-saves registers are registers which may be used within a procedure to hold values, and these values are guaranteed to remain unchanged after executing a call to another procedure. However, the values in these registers must be spilled before they are used and then restored to the register before exiting the procedure. The name "callee-saves" refers to the fact that the called routine is responsible for saving these registers before they are used.

In the absence of interprocedural information, callee-saves register spilling is necessary in every procedure which needs to use a register of that class. This creates significant overhead in many programs.

Some other references to related work include:

"LISP on a Reduced Instruction Set Processor: Characterization and Optimization", by P. A. Steenkiste of Stanford University Computer Systems Laboratory, PhD Thesis, Chapter 5, March 1987. This approach is similar to that of MIPS, except that it reverts to ordinary intraprocedural register allocation when the interprocedural registers are exhausted in upper regions of the call graph.

"Data Buffering: Run-Time Versus Compile Time Support" by Hans Mulder, Proceedings of the 3rd International Conference on Architectural Support for Programming Languages and Operating Systems, Apr. 3–6, 1989, pages 144–151. This approach is also similar to that of MIPS except that it is limited in scope to single compilation units.

"The Impact of Interprocedural Analysis and Optimization in the $R^n$ Programming Environment" by Keith D. Cooper, Ken Kennedy, and Linda Torczon of Rice University. Published in the ACM Transactions on Programming Languages and Systems, October 1986, pages 491–523. This paper describes a program compiler which computes interprocedural optimization information, but does not address the register allocation problem.

Hewlett-Packard's Apollo Division uses an interprocedural register allocation scheme within a single compilation unit in their DN10000 architecture compilers. As with the references above, except for the DEC paper, this approach does not attempt to keep global variables in registers across procedures.

What is needed is a method and apparatus for optimizing register usage where there is a limited number of available register resources in a computer processor and where a plurality of procedures and variables are involved.

SUMMARY OF THE INVENTION

According to the invention, two specific optimization techniques are implemented by means of a program analyzer used in connection with a program compiler to optimize usage of limited register resources in a computer processor. The first optimization technique, called interprocedural global variable promotion allows the global variables of a program to be accessed in common registers across a plurality of procedures. Moreover, a single common register can be used for different global variables in distinct regions of a program call graph. This is realized by identifying subgraphs of the program call graph, called webs, where the variable is used. The second optimization technique, called spill code motion, involves the identification of regions of the call graph, called clusters, that facilitate the movement of spill instructions to procedures which are executed relatively less often. This decreases the overhead of register saves and restores which must be executed for procedure calls.

The program analyzer according to the invention reads summary files produced by a compiler modified to create summary files containing, for each procedure of a source code file, global variable usage information, register need information, and names of called procedures. The compiler is run on each source code file separately to produce separate summary files. The program analyzer computes interprocedural register allocation information from the summary files and writes it out to a program database file. The program analyzer builds a single program call graph (PCG) from all the summary files. The PCG consists of a set of nodes, each representing a procedure, interconnected by directional edges, each representing a call from a first procedure to a second procedure.

Traditional intraprocedural register allocators have in the past employed data structure known as def-use chains to represent live ranges of variables. Def-use chains are analogous to spider webs linking equivalence classes of definitions and uses of a variable. Consequently, def-use chains are sometimes referred to as "webs". Webs have not been employed in the past in any interprocedural register allocation techniques. In other words, live ranges for global variables have not been computed across procedure boundaries.

In order to facilitate global variable promotion, the program analyzer identifies webs for selected global variables (the global variables selected are those variables that are eligible for assignment to an interprocedural machine register). A web for a single global variable is a collection of PCG nodes such that the global variable is accessed in at least one node of the web and such that, for each node in the web, the global variable is not accessed in any ancestor node not in the web, and the global variable is not accessed by any descendant node not in the web. Multiple webs may be identified for a single global variable.

The program analyzer then prioritizes the webs according to frequency of use of the corresponding global variable within nodes of the web. The webs can optionally be prioritized based on profile information collected from an earlier run of the compiled source files.

The program analyzer then assigns the first available interprocedural machine register to the selected webs in priority order. In assigning interprocedural machine registers to the selected webs, the program analyzer ensures that webs that have common PCG nodes are assigned different machine registers. The interprocedural registers assigned to the webs are chosen from a limited sub-set of machine registers designated for preserving values across procedure calls (callee-saves registers).

Unlike previous approaches, this method of interprocedural register assignment allows a single register to be used for different purposes in distinct regions of the PCG. Specifically, a single interprocedural register can be used for the promotion of different global variables in different regions of the PCG. This allows a larger number of global variables to be promoted than the approach described by David W. Wall. Moreover, with our method, global variables are not be promoted in the regions of the PCG in which the variable is not used.

Another function of the program analyzer is to facilitate the reduction of the overhead associated with saving and restoring callee-saves registers. This overhead is mitigated through spill code motion.

In order to facilitate spill code motion, the program analyzer first identifies clusters of nodes of the PCG. A cluster is a collection of PCG nodes such that there exists a unique root node of said cluster only through which every other node in the cluster can be called. Profile information collected form an earlier run of the compiled source files may be used to aid cluster identification.

Interprocedural machine registers are assigned to each cluster node, according to the register need for the corresponding procedure and as restricted by the cluster organization.

The root node of each cluster is designated to execute machine instructions to preserve the values of the interprocedural registers assigned to nodes of that cluster. The machine instructions are executed upon calls to the cluster root node so that other nodes within the cluster need not execute the machine instructions.

The assignment of interprocedural machine registers to global variable webs and cluster nodes are finally written out by the program analyzer to the program database.

The summary files read by the program analyzer are produced in conjunction with intermediate files by a first phase of compiler operation. In a second phase, the program database file and intermediate files created by the first phase, are processed to produce individual object code files with the requisite interprocedural register assignments. In this stage, the pseudo-register operands used in the intermediate code (read from the intermediate files) are mapped into machine registers by a register allocator. The register allocator uses the interprocedural machine registers specified in the program database file to map certain pseudo-registers to machine registers.

For each procedure corresponding to a node of a web that was assigned an interprocedural machine register by the program analyzer, all memory references to the corresponding global variable are converted into interprocedural register references. At the root nodes of webs that were assigned an interprocedural machine register, instructions are added at the entry point to load the value of the corresponding global variable from memory into the interprocedural register and at the exit point to store the value back to memory. Additionally, machine instructions (spill code instructions) are added to preserve the value of the interprocedural register across calls to that root node. These transformations effectively promote the storage class of the selected global variables to register i.e. they result in global variable promotion.

For each procedure corresponding to a node of a cluster that was assigned interprocedural machine registers by the program analyzer, certain pseudo-registers are mapped into those interprocedural machine registers instead of the ordinary callee-saves registers. Machine instructions are added at the root nodes of clusters designated to preserve the values of the interprocedural registers assigned to nodes of that cluster. These transformations effectively result in spill code motion.

The invention will be better understood by reference to the following detailed description in connection with the accompanying drawings.

DESCRIPTION OF SPECIFIC EMBODIMENTS

The invention is described by a specific embodiment as might be implemented on a Hewlett-Packard Precision Architecture computer system. The invention may be applied to any computer system where there is a finite number of registers and more particularly to computer systems where the number of registers available for computation and other processing is limited. This invention applies particularly to computer systems that categorize the available registers by software convention into callee-saves and caller-saves register partitions. The invention operates on source files, which are human readable high-level program fragments which comprise procedures.

Figure 1:
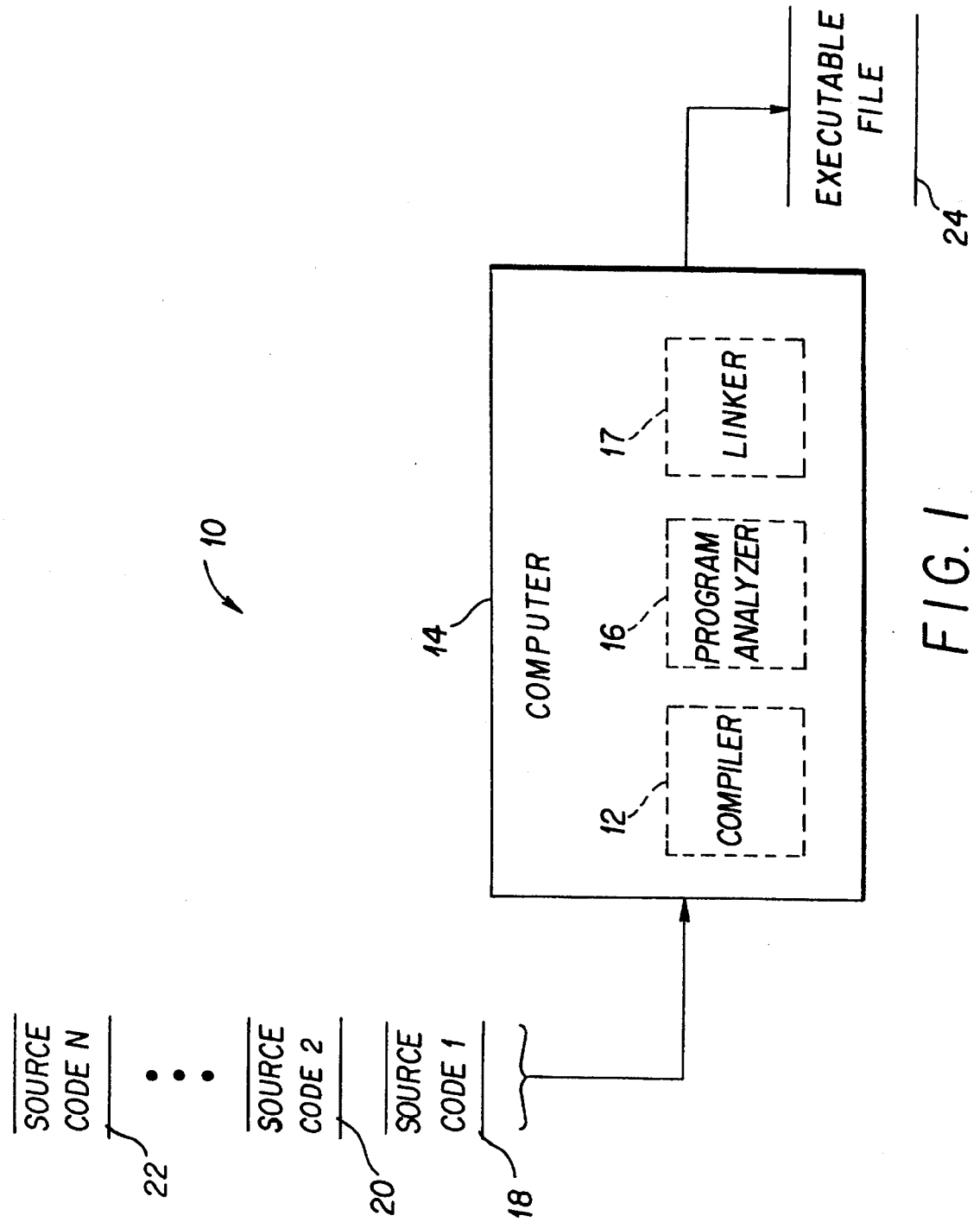
FIG. 1 is a block diagram of a computer system incorporating the invention.

Referring to FIG. 1, there is shown a computer system 10 incorporating the present invention. A compiler 12, is resident in a computer 14, including a processor, and a program analyzer 16 is resident in the computer 14 in accordance with the invention. The invention operates as follows:

A plurality of source code files 18, 20, 22 are supplied one at a time as input to the computer 14. The computer 14, through the use of the compiler 12 and the program analyzer 16, processes the source code files 18, 20, 22 to produce object files incorporating interprocedural register allocation optimization in accordance with the invention. The object files are linked into an executable file 24 by a linker 17. The executable file 24 may be run on the computer 14 or on another machine of the type for which the compiler has generated the executable file 24.

Figure 2:
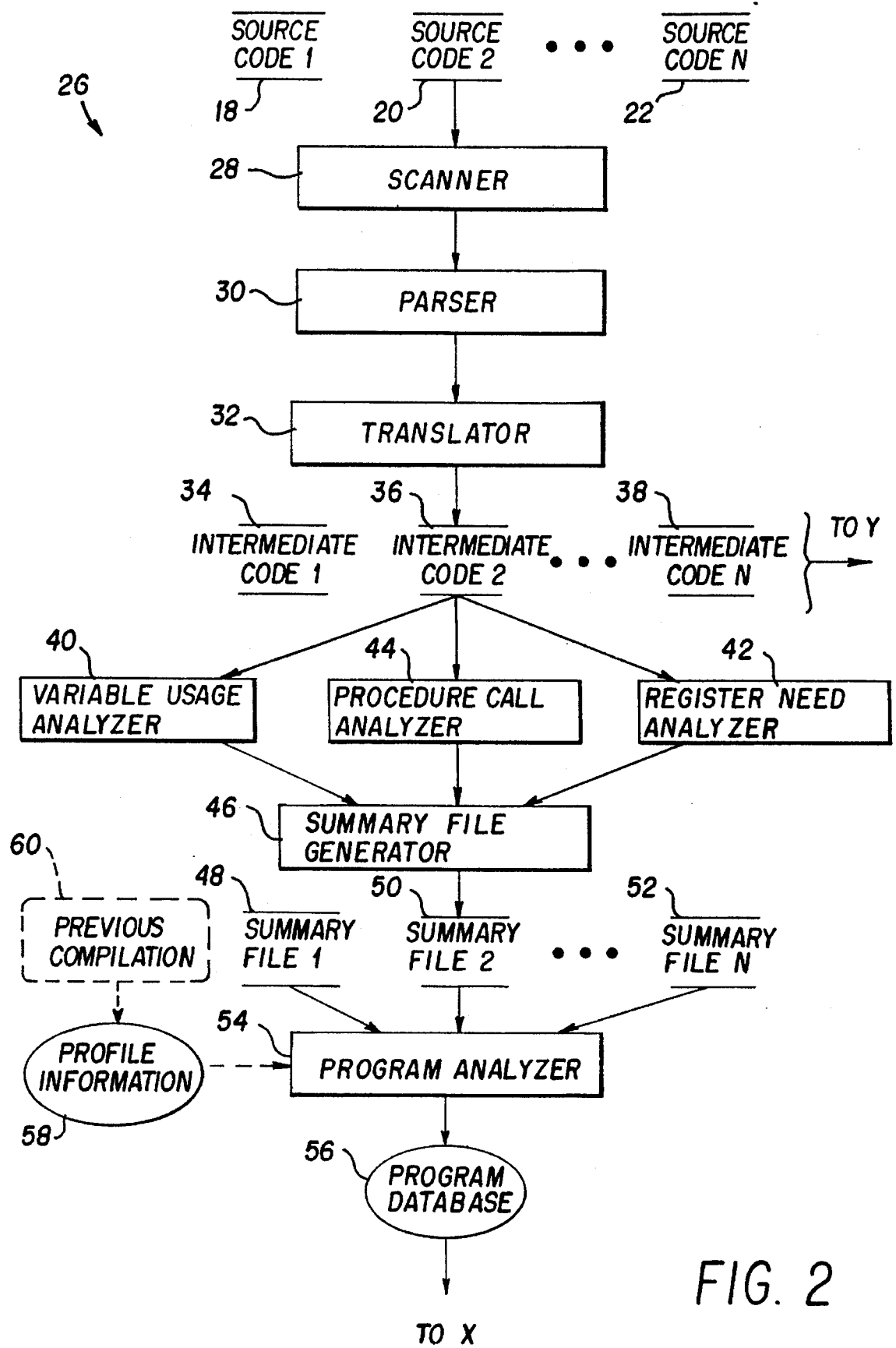
FIG. 2 is a block diagram of a computer program compilation system in accordance with the invention.
Figure 3:
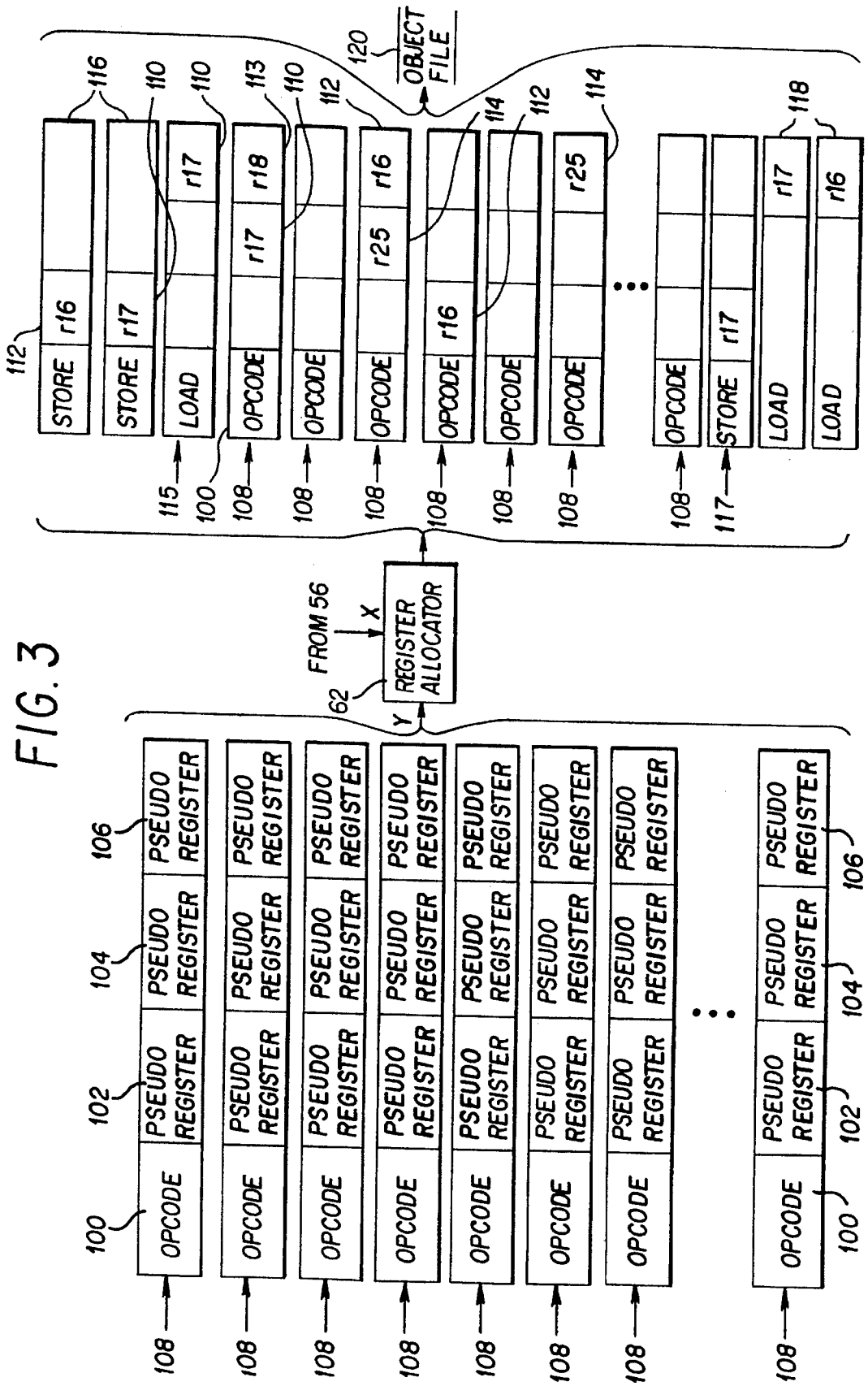
FIG. 3 is a block diagram of a register allocator used in accordance with the invention.

Referring to FIG. 2, there is shown a block diagram of a portion of an apparatus 26 for performing interprocedural register allocation in accordance with the invention. The apparatus 26 comprises a scanner 28, for sequentially reading source code files 18, 20, and 22, a parser 30, coupled to receive from the scanner 28, lexically checked tokens of the source code files one at a time for verifying syntactic correctness. In addition, a translator 32, coupled to receive the output of the parser 30 is operative to check for semantic correctness and to generate an intermediate code representation 34, 36, 38, for each of the source code files, respectively. The intermediate code is an ordered list of procedures translated from the source code. Each procedure consists of a sequence of machine instructions 108, each of which consists of an opcode 100 and pseudo-registers 102, 104, 106 as shown in FIG. 3. The intermediate code is temporarily stored for subsequent use or regenerated later. Each unit of the intermediate code is analyzed by a variable usage analyzer 40, register need analyzer 42, and a procedure call analyzer 44.

The variable usage analyzer 40, identifies the global variables used in each procedure, and the nature of the access to the global variables.

The procedure call analyzer 44 identifies the names of the called procedures and the nature of the calls to each procedure.

The register need analyzer 42 estimates machine register need by examining the intermediate code.

The summary file generator 46 outputs the results produced by the analyzers to summary files 48, 50, 52 in accordance with the invention. The summary file contains a record for each procedure in the corresponding source files. The summary files 48, 50, 52 are processed serially by a program analyzer 54 which analyzes the summary files as herein below described. The results of the program analyzer analysis is stored in a program database 56.

Optionally, profile information from a profile information file 58 is also provided to the program analyzer 54. The profile information is collected from an earlier run of the result of a previous compilation 60 of the same source files 18, 20, and 22.

Referring to FIG. 3 there is shown an illustration of a register allocator 62 in accordance with the invention. The register allocator 62 is operative to receive the information in the program database 56 and the intermediate code 34, 36, 38 in the form of procedures. Each procedure consists of a sequence of instructions 108, each of which consists of an opcode 100 and pseudo-registers 102, 104, and 106. The register allocator 62 is responsible for converting memory references to promoted global variables into interprocedural register references. The register allocator 62 is also responsible for replacing all of the pseudo-registers 102, 104, 106 in the intermediate code with machine registers, some of which may be interprocedural registers 110, 113. The register allocator is also responsible for adding spill code 116, 118 to preserve the values of certain registers, including the interprocedural registers in root nodes of clusters and webs as herein after explained.

The result of register allocation for each set of procedures is output to an object file 120, which is in turn processed by the linker 17 (FIG. 1) into an executable file 24 (FIG. 1).

Figure 4:
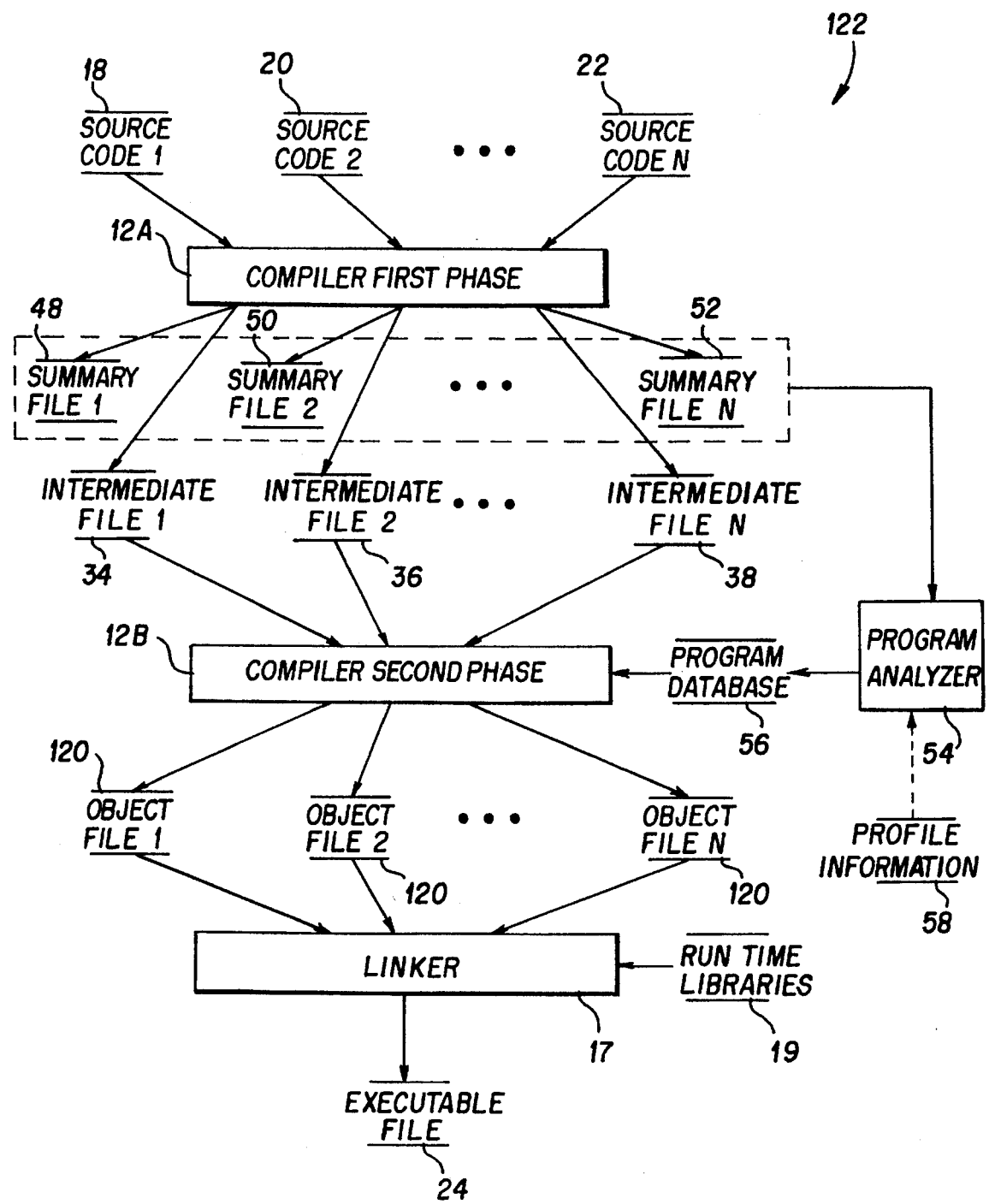
FIG. 4 is an internal view of the compilation system operational in accordance with the invention.

Referring to FIG. 4, there is shown an internal overview of the compilation system 122 with source files 18, 20, 22, summary files 48, 50, 52, intermediate files 34, 36, 38, program analyzer 54, profile information 58, program database 56, object files 120, the linker 17, run time libraries 19, an executable file 24. The compiler comprises a first phase 12A and a second phase 12B. The compiler first phase shown in FIG. 4 comprises the scanner 28, the parser 30, and the translator 32 shown in FIG. 2. The compiler second phase 12B shown in FIG. 4 includes the register allocator 62 shown in FIG. 3.

The collection of summary files 48, 50, 52 produced by the compiler first phase 12A is exposed to the program analyzer 54. The program analyzer is responsible for constructing a program call graph 130 (FIG. 5) for the program, identifying webs and clusters for the program call graph and making decisions about how interprocedural registers are to be allocated to the webs and clusters across that graph 130.

The program call graph 130 comprises nodes A, B, C, D, E, F, G, H, and I with directional edges 132, 134, 136, 138, 140, 142, 144, 146, and 148 connecting the nodes. Webs 150, 152, 154, and 156 are identified for the program call graph 130 in FIG. 5 and clusters 158, 160, and 162 are identified on the same program call graph 130 in FIG. 7 as hereinafter explained.

An interprocedural register is allocated to each selected web. A plurality of interprocedural registers are allocated to nodes of each cluster. These allocations are recorded in the form of register actions to a program database 56 of information about the program. The register allocator 62 uses information from the program database 56 to guide register allocation on each procedure in the intermediate file, one at a time.

The program analyzer 54 has been designed with the availability of profile information 58 in mind. In a particular embodiment, the implemented algorithms are not dependent on profile information, but some of the heuristics used in the program analyzer can be improved with profile information 58.

The Program Analyzer

The program analyzer 54 generates the program database 56 by completing the following tasks, in order.

Figure 5:
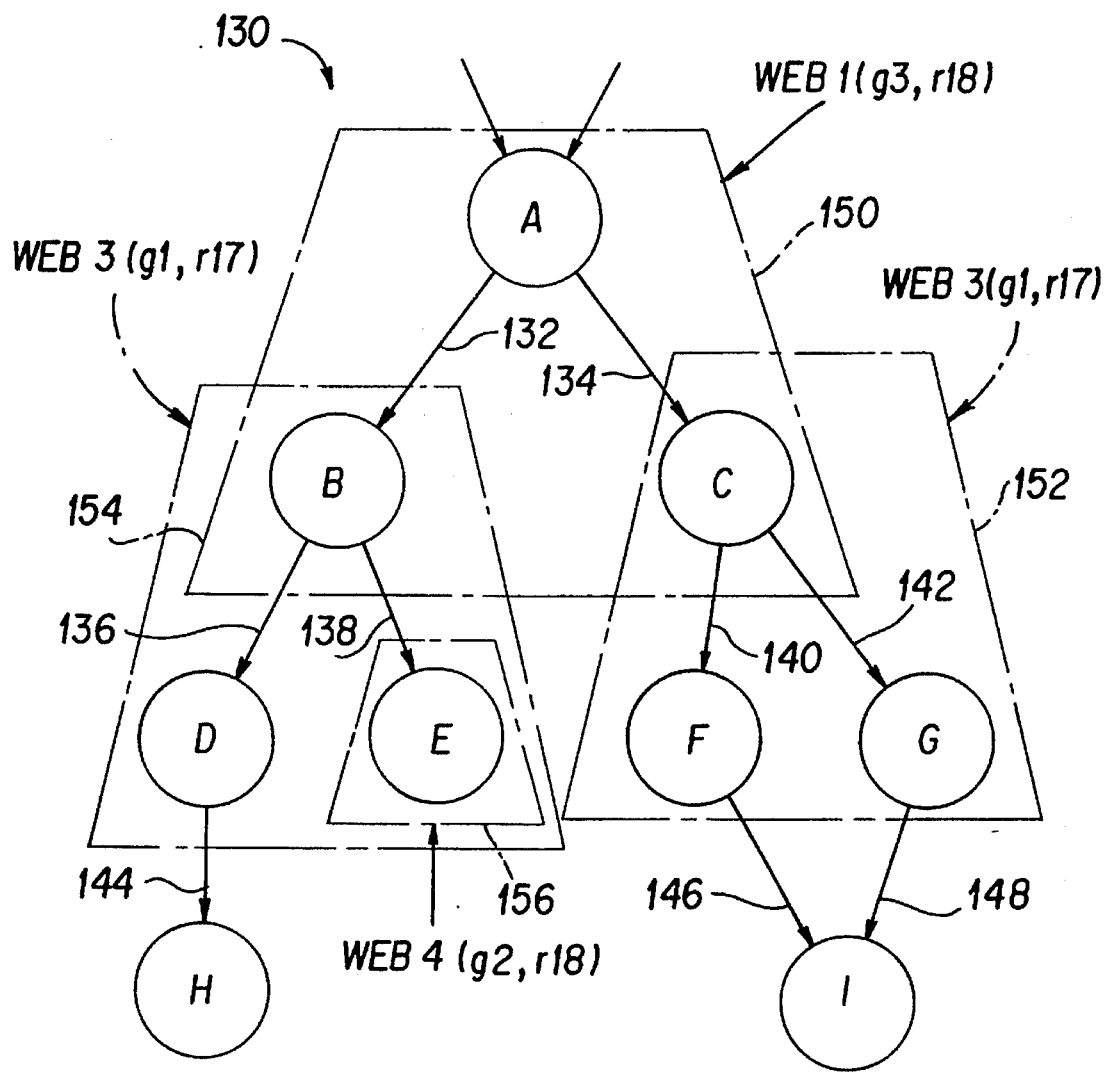
FIG. 5 illustrates a sample program call graph and the webs identified for three global variables.

[1] Build a program call graph 130 (FIG. 5).

[2] Identify webs for global variables and select webs for which interprocedural registers are to be allocated.

[3] Assign interprocedural registers to the webs selected in step 2.

[4] Identify clusters in the call graph.

[5] Pre-allocate registers to the nodes of each cluster identified in step 4 and identify the registers that must be spilled at the root of each cluster.

[5] Compute register actions for each node of the program call graph and write these out to the program database.

Global Variable Promotion Strategy

Interprocedural register promotion is an optimization that attempts to maintain certain important user global variables in registers across procedure boundaries.

The preferred embodiment makes use of the compilation system shown in FIG. 4 to automatically promote key global variables to registers across procedure boundaries. The compiler first phase 12A is responsible for communicating the callee-caller relationships and global variable usage for each of the source files 18, 20, 22 to the program analyzer 54 through summary files 48, 50, 52.

The program analyzer 54 collects the global variable usage information across all source files that make up the program. It determines which globals are ineligible for register promotion and of the remaining global variables, selects those that are the most heavily referenced, for register promotion.

The program analyzer 54 partitions the references to a global variable into disjoint webs and consider each web individually for register allocation.

A web, for the purposes of interprocedural global register allocation, identifies a minimal set of nodes in the call graph over which an eligible global variable could reside in an interprocedural callee-saves register (without requiring caller spill). Typically, the nodes of a web would be a connected subgraph which use or define the web variable. The subgraph is selected such that no ancestral node or descendent node in the call graph references the same web variable.

Each web can have one or more entry nodes. These entry nodes are basically the root nodes of the web subgraph. Typically, an entry node would contain references to the global variable while none of its direct predecessors would. All descendant nodes of each entry node that either have a local reference or a child reference to the global, are part of the web. If a web is selected for promotion, at every node of the web, references to the global memory variable would be replaced by a register reference to a reserved interprocedural callee-saves register which would be unavailable for normal intraprocedural register coloring.

Additionally, at the entry nodes of the web, the global variable is loaded into the reserved callee-saves register on entry and stored back on exit (e.g. instructions 115 and 117 in FIG. 3). (Note that this allows a global variable whose value has been initialized at compile time to be safely promoted to a register.) For this approach to work, entry nodes are required to have ONLY external predecessors nodes and internal nodes are not allowed to have ANY external predecessors.

Figure 9:
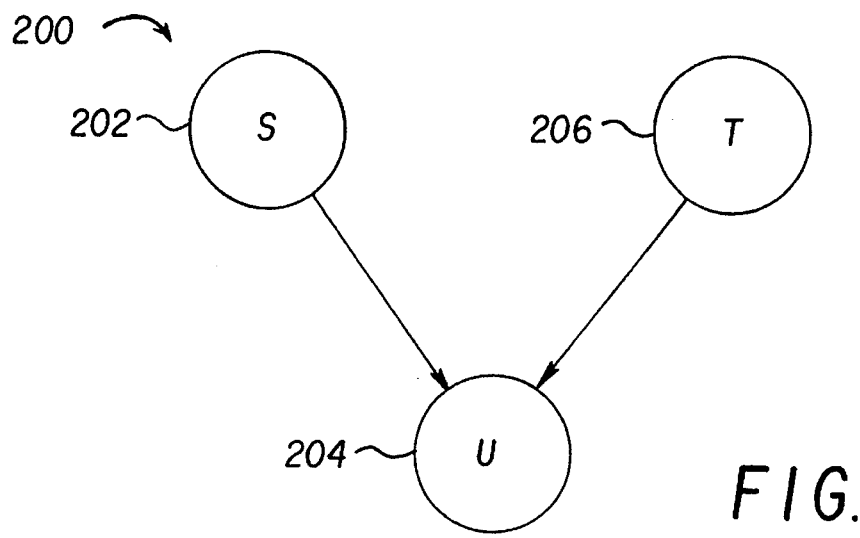
FIG. 9 is another sample program call graph to illustrate a potential web identification problem.

To meet this requirement, special entry nodes may need to be added to the web. For example, consider the program call graph 200 in FIG. 9. Suppose a global variable g3 is referenced in procedures S 202 and U 204, but not in procedure T 206. Suppose further that the web for g3 were to include only nodes S and U. If that web is assigned an interprocedural register, the instructions for procedure U will reference the value of g3 from that interprocedural register. When U is called from T, however, no instructions will have been executed to place the most recent value of g3 in that interprocedural register. This will be an incorrect translation of the source code. To solve this problem, procedure T is added to the web and designated to be an entry node.

The webs for a global variable are identified by using dataflow sets (bit vectors of numeric global identifiers, L_REF, C_REF, and P_REF) at each node of the call graph. These dataflow sets are computed by propagating the local reference information at each node throughout the call graph. After the webs are built, an interference graph is constructed. In an interference graph, each node represents a web and each edge represents an interference between two webs. Two webs interfere with each other if the respective global variables are simultaneously 'live' at one or more nodes in the call graph (i.e. if the two webs have common call graph nodes). A global variable is 'live' at a node, if there are references to that global variable either at that node or in an ancestral or descendent node in the program call graph.

Note that by definition, two different webs of the same global variable will never interfere with each other. The nodes of the interference graph will be assigned (colored with) one of the reserved callee-saves registers in a manner which avoids assigning the same register to adjacent nodes in the interference graph. Before coloring, the webs are sorted into an order based on heuristics. If a node is colored successfully, then the corresponding web is in effect promoted to a register. Register actions will then be assigned to the nodes comprising a colored web. These register actions are used to direct the register allocator on how to promote the global variable to a register. The register actions for a node could include one or more of the following directives.

1. Make callee-saves register R unavailable for intraprocedural use.
2. Add save and restore code for register R (e.g. instructions 116 and 118 in FIG. 3).
   Also, add load and store instruction for global variable G (e.g. instructions 115 and 117 in FIG. 3) to and from callee-saves register R on entry and exit (e.g. for variable g1 in procedure B in FIG. 5).
   Note that a load or store instruction can be generated from the information in the program database.
3. All references to global variable G (e.g. g1 in FIG. 5) are to be replaced with references to callee-saves register R (e.g. r17 in FIG. 5).

The register actions for each node are written out to the program database 56 by the program analyzer 54 and later queried and used by the compiler phase 2 (12B in FIG. 4).

Figures 6, 8:
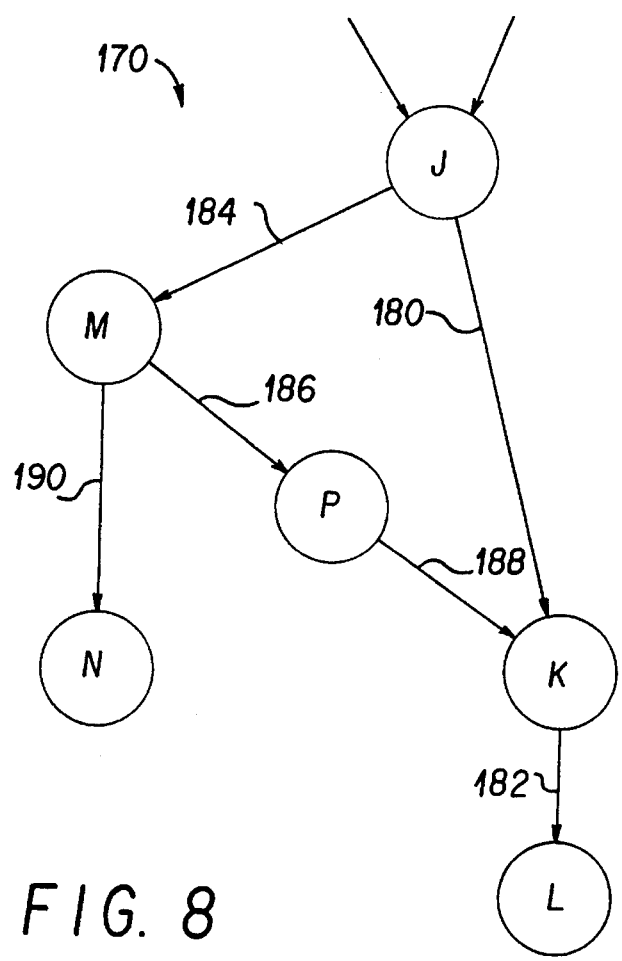
FIG. 6 is a table describing the usage of the global variables at different nodes of the program call graph illustrated in FIG. 5.
FIG. 8 is another sample program call graph to illustrate a potential cluster identification problem.

To better understand the algorithm described below, consider FIG. 5 and FIG. 6. The nodes of the program call graph 130, labeled A through I represent procedures and the edges 132, 134, 136, 138, 140, 142, 144, 146, 148 between these nodes represent procedure calls. FIG. 6 describes how three global variables g1, g2, g3 are accessed by the different nodes of the program call graph.

The webs 150, 152, 154, 156 are identified for these three global variables. Note that there are two separate webs 152, 156 for the global variable g2. For this example, all four webs can be promoted using just two callee-saves registers, r17, r18. These callee-saves registers could correspond to the interprocedural registers 110 and 113 shown in FIG. 3.

Different webs for the same variable may be assigned different registers. This is the case for web 4 156 and web 2 152 for global variable g2, which are assigned registers r17 and r18 respectively.

The compiler second phase 12B is responsible for converting memory references to global variables corresponding to promoted webs into register references. For example, memory references to global variable g2 are converted into references of register r17 in procedures C, F, and G. Additionally, at the entry procedure C for web 2 152, code is inserted at the beginning to load the global variable g2 into the register r17. Code is also inserted at the end of procedure C to store back the global variable g2 from register r17 to the memory location in the computer associated with that variable.

Interprocedural Global Register Promotion Algorithm

The following pseudo-code provides guidance for coding the algorithms discussed herein. This pseudo-code is based on the "C" programming language.

Input

A program call graph of 'n' nodes. It is assumed that the representation of the call graph allows easy identification of a node's successors and predecessors.

For each node of the call graph, a list of global variables that are explicitly referenced, a set of heuristically assigned reference frequencies for those globals, and the set of global variables (not necessarily a subset of those referenced) whose address have been taken or are otherwise ineligible for promotion. This information is computed by the variable usage analyzer 40 shown in FIG. 2.

Output

For each node of the call graph, intraprocedural register actions required to maintain a selected set of singleton global variables in registers within certain regions of the call graph.

Main Data Structures

L_REF [i]
  The dataflow set representing Local_References. For each node i, L_REF[i] represents the set of eligible global variables (indices) referenced locally at that node.

P_REF [i]

The dataflow set representing Parent_References. For each node i, P_REF[i] represents the set of eligible global variables (indices) referenced by all parent nodes of node i. A parent node is any node in the call graph from which there is a forward call path (an invocation sequence without procedure returns) to node i.

C_REF [i]

The dataflow set representing Child References. For each node i, C_REF[i] represents the set of eligible global variables referenced by all child nodes of node i. A child node is any node in the call graph to which there is a forward call path (an invocation sequence without procedure returns) from node i.

R_Action [i,g]

Register Actions (1..3) at node i for promoted global variable

Ref_Count [g,i]

The reference count for variable g at node i

Global_Table [g]

For each unique eligible global g, there is an entry in the Global_Table. Each entry for a global variable in the Global_Table has a unique index that is its numeric identifier (which is used in the dataflow sets). Each entry also contains the set of call graph nodes which access that global. The organization of this symbol table allows for easy entry, deletion and translation between the global variable name and entry index.

Web_Table [w]

For each web (identified by its entry index in this table), the Web_Table entry contains the numeric global index, the entry nodes of the web, the other nodes of the web, and the total reference count of the global over the nodes in the web.

Web_Interferences [w]

This is the web interference graph. The Web_Interferences entry for each web contains the web numbers of all other webs that it interferes with.

Pseudo-code

```
Allocate_Global_Registers()
{
        Initialize_Global_Table();

Compute_P_REF ();

Compute_C_REF ();

for each global_id in Global_Table do {
         Compute_Webs (global_id);
        }

Compute_Web_Interferences ();

Color_Webs ();

Compute_Reg_Actions ();
}

Initialize_Global_Table ()
{
   for each summary file do {
        Open the summary file for reading;
        for each procedure p in the summary file do {
             /* see File Structure Description given later */
             for each Global_Usage_Info_Record do {
                  if (global exists in Global_Table[]) then
                       i = Global_Table[] index for global;
                  else
```

```
                    Add Global_Var_Name to Global_Table[i];
                    Global_Table[i].Ref_nodes += {p};
                    Ref_Count[i,p] = Weighted_Reference_Count;
                }
            }
            Close the summary file;
        }

/*
            Now the globals ineligible for register promotion
            need to be removed from the Global_Table[]. A global
            is ineligible if it's address has been taken, if it's
            a volatile variable, or if there have been abnormal
            references to it, as indicated by the Global_Attributes.
        */ for each entry in Global_Table[] do {
            if (global ineligible for promotion) then {
                Remove Global_Var_Name From Global_Table[];
            }
        }

/* The variable names present in the Global_Table are
        /* now the candidate globals that are eligible for
        /* interprocedural register allocation */ for each global i in Global_Table do {
            for each proc p in Global_Table[i].Ref_nodes do {
                L_REF[p] = L_REF[p] + { i };
            }
        }
    }

Compute_P_REF ()
    {
        repeat {
```

```
            Changes := false;
            for each node n in Depth First Search order do
                Calc_P_REF (n);
        } until no Changes;
    }

Calc_P_REF (i)
    {
        temp_P_REF := ∅;
        for each predecessor p of i do {
            temp_P_REF := temp_P_REF ∪ (P_REF[p] ∪ L_REF[p]);
        }
        if (temp_P_REF ≠ P_REF[i]) then {
            P_REF[i] := temp_P_REF;
            Changes := true;
        }
    }

Compute_C_REF ()
    {
        repeat (
            Changes := false;
            for each node n in reverse Breadth First Search order do
                Calc_C_REF(n);
        } until no Changes;
    }

Calc_C_REF (i)
      {
          temp_C_REF := ;
          for each successor s of i do {
              temp_C_REF := temp_C_REF ∪ (C_REF[p] ∪ L_REF[p]);
```

```
            }
        if (temp_C_REF ≠ C_REF[i]) then {
            C_REF[i] := temp_C_REF;
            Changes := true;
        }
    }

Compute_Webs (g)
{

/*
    Build webs by first identifying primary entry nodes.  A
    requirement for a primary entry node is that the
    global_id be part of its L_REF set but not the P_REF
    set.  Any references to the global found within a
    strongly connected component of the call graph will get
    considered last.
    */

Ref_nodes := Global_Table[g].Ref_nodes;
    Scc_refs := false;
analyze_refs:
    for each node p in Ref_nodes do {
        /* g ∈ L_REF[p] */
        if (g ∈ P_REF[i]  && !Scc_refs) then
            continue;
        /* p is a potential entry_node */
        web_nodes := ∅;
        entry_nodes := {p};
        repeat {
            for each node e in entry_nodes do
            {
                Expand_web (&web_nodes, e, g);
            }
            entry_nodes := ∅;
```

```
            web_is_legal :=
              Check_if_web_is_legal(web_nodes, &entry_nodes);
        } until web_is_legal;
        /* see if this web can be merged with
           previously found webs */
        Merge_webs (web_nodes);
    }

/*
       Now consider L_REF nodes in cycles.  Note that none
       of the nodes in cycles would have been identified
       as entry nodes since (g ∈ P_REF[i]) for all nodes in
       a cycle.
    */
    if (!Scc_refs && Ref_nodes ≠ ∅) then {
        Scc_refs := true;
        goto analyze_refs;
    }
    Add_to_web_table(g);
}

Expand_web (web_nodes, p, g)
{
    /* This routine recursively finds all successor nodes
       of p that should belong to the web for global g.
       These nodes are passed back through the web_nodes
       reference parameter.
    */
    web_nodes += ( p );
    if (p ∈ Ref_nodes) then {
        Ref_nodes := Ref_nodes - (p);
    }
    for each successor s of p do {
        if (((g ∈ C_REF[s]) || (g ∈ L_REF[s])) &&
            (s ∉ web_nodes)) then {
            Expand_webs (web_nodes, s, g);
```

```
            }
        }
    }

BOOLEAN Check_if_web_is_legal(web_nodes, new_entry_nodes);
{
    /*
    This routine checks if any web_node has both
    INTERNAL and EXTERNAL predecessors.  It returns
    false if this is the case. All external predecessors
    of such web_nodes should be made part of the web and
    are passed back as new new_entry_nodes.
    */ legal_web := true;
    for each node i in web_nodes do {
        Int_pred := Ext_pred := false;
        Ext_pred_nodes := ∅;
        for each predecessor p of node i do {
            if ( p ∈ web_nodes )  then {
                Int_pred = true;
            }
            else {
                Ext_pred = true;
                Ext_pred_nodes = Ext_pred_nodes ∪ { p };
            }
        }
        if (Int_pred && Ext_pred) then {
            legal_web := false;
            new_entry_nodes := new_entry_nodes ∪
                                            Ext_pred_nodes;
        }
    }
}
```

```
Merge_webs (new_web)
{
    /*
       This routine maintains a temporary list of webs for the
       global variable currently being analyzed.  It checks to
       see if the newly identified web has any nodes in common
       with the previously identified webs.  If so, the webs
       are merged as needed such that the new list of webs are
       disjoint.  Note that merging 2 webs that are each legal
       results in a merged web that continues to be legal.
    */ for each web w of g in Temp_Web_List do {
        if ( (new_web ∩ w) ≠ ∅) then {
            new_web := w ∪ new_web;
            delete w from Temp_Web_List;
        }
    }
    Add new_web to Temp_Web_List;
}

Add_to_web_table(g)
{
    /*
       This routine transfers the webs on the Temp_Web_List
       to the Web_Table[], discarding webs that would not
       be worthwhile to to promote to a register.  It also
       figures out the true entry_nodes for each web.
    */ for each web w of g in Temp_Web_List do {

/* use some heuristics to decide if this web is worthy
           of promotion
        */
```

```
        if (web is unworthy of promotion) then
            continue;

entry_nodes := ∅;
    for each node i in w do
        Add each predecessor p of node i not in w
            to entry_nodes;
    web_id := next available entry in Web_Table[];
    Web_Table[web_id].nodes := w;
    Web_Table[web_id].Entry_nodes := entry_nodes;
    Web_Table[web_id].intf := ∅;
    Web_Table[web_id].reg := 0;
    }
)
```

The remaining pseudo-code routines are not specified in detail because they use generally available graph coloring algorithms.

```
        if (web is unworthy of promotion) then
            continue;

entry_nodes := ∅;
    for each node i in w do
        Add each predecessor p of node i not in w
            to entry_nodes;
    web_id := next available entry in Web_Table[];
    Web_Table[web_id].nodes := w;
    Web_Table[web_id].Entry_nodes := entry_nodes;
    Web_Table[web_id].intf := ∅;
    Web_Table[web_id].reg := 0;
    }
}
```

```
25    Compute_Web_Interferences ()
      {
          /*
              Computes the web interference graph.
          */
30
          For each entry w1 in the Web_Table[]
              For each entry w2 in the Web_Table[]
                  If ((Web_Table[w1].nodes ∩ Web_Table[w2].nodes) ≠ ∅)
                  {
35
                      /* Add a mutual interference between w1 & w2
                          in the Web_Interferences[] Table.
                      */
                      Web_Table[w1].intf ∪= { w2 };
                      Web_Table[w2].intf ∪= { w1 };
```

```
        }
    }

Color_Webs ()
    {

For each web of every global g, compute the web savings
        value if that web were to be promoted to a register, using
        some heuristics.  For example, webs with many entry nodes
        and few internal nodes that reference the global should
        be assigned a low savings.  Use profile information to
        assist in identifying heavily accessed nodes and/or
        variables if it is available and selected by the user;

Sort the webs for every global g, based on the web savings
        value;

/*
            Color the Web Interference Graph using a fixed
            number of interprocedural callee-saves registers by
            visiting the Webs in the Sort order determined in
            Step 1.

If a web can't be colored, skip over it.
        */ for each web w in sort order do {
            available_regs := fixed subset of callee_saves regs;

for each web x in Web_Table[w].intf do {
                if (Web_Table[x].reg ≠ 0) then
                    available_regs -= Web_Table[x].reg;
            }
            if (available_reg ≠ ∅) then
                Web_Table[w].reg := first available_reg;
        }
```

```
        }

Compute_Reg_Actions ()
{
    /*
        This routine computes register actions described
        below for the nodes of the call graph.  These
        register actions are written to the program database,
        read by the compiler phase 2 and applied to each
        procedure by the register allocator.

Register Action 1 :
            - Callee-saves register X is not
              available for intraprocedural use
              (i.e. it is an interprocedural register)

Register Action 2 :
            - Insert code to preserve the original contents of
              interprocedural register X
            - Insert code to load up global variable g into
              interprocedural register X at the entry point.
            - Insert code to store the global variable g from
              interprocedural X at the exit point.
              (i.e. this is a register action to be applied at
              web entry node, e.g. for variable g1 and
              register r17 at procedure B in Figure 5)

Note that the load/store instruction can be generated
            from the information in the program database.

Register Action 3 :
            - Convert all memory references to global variable
              Y into register references to the
              interprocedural register X (e.g. variable g1 and
              register r17 in Figure 5).
    */
```

Register Spill Optimization

Software procedure calling conventions designate two classes of registers, callee-saves and caller-saves registers. Callee-saves registers that are used must be spilled to memory at procedure entry points and restored at exit points. These registers may be used to keep live values across calls to other procedures. Caller-saves registers cannot hold live values across calls, so their contents must be temporarily saved in memory if those contents are needed after the call.

The simple idea behind register spill optimization is to move callee-saves register spill upwards in the call graph so that descendant nodes may use them "for free", hence the term, spill node motion.

The method according to the invention has the following features:
- Regions of the call graph called clusters are identified over which spill code motion may be effective.
- The callee-saves registers are pre-allocated to nodes of the cluster by the program analyzer. This allows the register allocator to have some knowledge of every procedure's register usage without forcing the procedures to be compiled in any particular order.
- Calls may still be made to procedures that are not known until link time or load time, as long as those procedures follow the standard register usage conventions.
- In some procedures, a larger number of caller-saves registers will be available than is allowed by the standard convention.
- The available set of callee-saves registers should get utilized more efficiently.

Clusters

Clusters are identified for two reasons. First, to identify the nodes where it is safe and correct to execute spill code for other procedures. Second, to execute spill code relatively infrequently in order to reduce overhead and achieve a performance improvement.

Conceptually, a cluster is a collection of nodes in the call graph that can be viewed as a single entity with regards to register allocation. The procedure calling convention will be adhered to at the boundary of a cluster, but not internally. The idea is to have some nodes within the cluster be able to use callee-saves registers without incurring the expense of saving and restoring them on entry and exit respectively. If such nodes within the cluster are heavily called, then a measurable performance improvement should result.

Breaking up an entire call graph into disjoint clusters of nodes enables more effective pre-allocation of callee-saves registers within smaller regions. Without the notion of clusters, one would run out of the few callee-saves registers quickly in large programs. Regardless of which way callee-saves registers are pre-allocated (top-down or bottom-up), certain regions of the call graph would be deprived of any benefit (or possibly even impacted negatively).

Ideally clusters should be shallow with many nodes close to the cluster root node. In addition, the root node should be invoked less frequently than the internal nodes. Propagating up the callee-spill code within the cluster to the root node should then speed up the application. One is less likely to run out of callee-saves registers for clusters that are short. Additionally, wide clusters will allow the allocation of the same set of callee-saves registers to many sibling nodes within the cluster.

Finally, partitioning the call graph into many different small clusters is preferable to having a few large clusters. This should allow a more uniform distribution of entry-spill code across the entire call graph. Also, the pre-allocation algorithm can try to move entry-spill code across clusters if desired.

Cluster Definition

A cluster in the call graph is defined as a set of nodes with the following properties:
[1] There exists some node R (e.g. A in FIG. 7), called the root of the cluster, which dominates all other nodes within the cluster. (Node D dominates node N if and only if every path from any start node to N includes D.) Note that this does not imply that all nodes dominated by the root node are in the cluster.
[2] For every node P (e.g. E in FIG. 7) in the cluster except R, all immediate predecessors of P (e.g. B in FIG. 7) are also in the cluster.
[3] A non-root node P is included only in the cluster of the immediately dominating root node.

For spill code motion to improve performance, the root node of a cluster should be called less frequently than the internal nodes of the cluster. This can be estimated by associating weights on the edges of the call graph which indicate relative call frequencies. These weights can be heuristically derived by the compiler first phase, but they may be more accurately assigned by using profile information.

Root nodes are selected by examining the incoming and outgoing calls at each node. The successors of a root node are added to the cluster by applying conditions [1] and [2]. Note that condition [3] allows a leaf node of one cluster to also be the root node of another cluster (e.g. C and D in FIG. 7).

Register Pre-Allocation

The register need analyzer of the compiler first phase can communicate the approximate callee-saves register requirements to the Program Analyzer by performing normal intra-procedural register allocation on the intermediate code generated. Based on this information for each node of a cluster, registers are allocated within each cluster starting at the root of the cluster and working downwards.

In effect, the callee-saves registers are split into four classes which describe how each register can be used within each procedure. The classes are defined by two conditions: 1) whether or not the register must be spilled on entry and restored on exit when it is used in the procedure and 2) whether or not the register can be used to hold values across procedure calls. These classes are identified by the following sets:

FREE[P]—registers in this set need not be spilled if they are used, and may hold live values across calls. These are essentially the interprocedural registers.

CALLER_SAVES[P]—registers in this set need not be spilled if they are used, but may not hold live values across calls.

CALLEE_SAVES[P]—registers in this set must be spilled if they are used, and may hold live values across calls.

MSPILL[P]—registers in this set must be spilled if they are used and they may not hold live values across calls.

When register assignment is done by the register allocator 62 (FIG. 3) for a procedure, the register allocator will query the program database 56 to identify which set each machine register belongs to, and replace each pseudo-register 102, 104, 106 with a machine register 112, 113, 114 from the appropriate set. The register allocator 62 must also add spill code 116, 118 for those machine registers assigned from the CALLEE_SAVES and MSPILL sets.

There is an additional requirement in the register allocator that all registers in in the MSPILL set at a cluster root procedure must be spilled on entry and restored on exit (spill code 116 and 118 in FIG. 3), regardless of whether or not they are actually used inside that procedure. This will accomplish the goal of having the root node execute the spill code for the remaining nodes of the cluster. The algorithms described hereinafter arrange that MSPILL will always be empty at non-root nodes belonging to a cluster.

The algorithms described hereinafter also eliminate the possibility of recursive call cycles from occurring within a cluster. Consider the simple case of a self-recursive routine which uses callee-saves registers. Such a routine would expect that the values in these registers would remain safe across the recursive call. If spill code is not executed at the entry point, however, the values that were live across that recursive call will be destroyed.

Recursive cycles are prevented from occurring within clusters. However, entire clusters may occur within cycles in the call graph.

If there exists a node within a cluster that makes a call back to the root node, pre-allocation will note be done on that cluster. This is done for performance reasons.

The pre-allocation technique herein proposed has one major vulnerability. In particular, if a selected cluster root node is a procedure that is called more frequently than the other nodes of the cluster, calls to that procedure would be slowed down.

Figure 7:
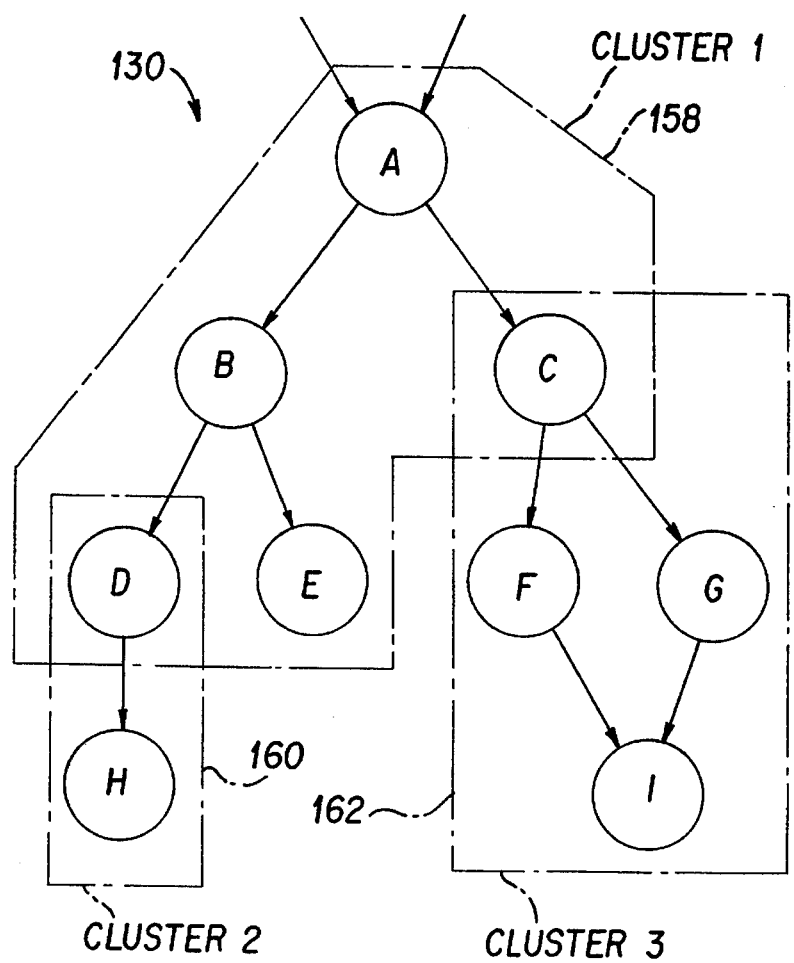
FIG. 7 illustrates clusters of nodes within the same program call graph shown in FIG. 5.

FIG. 7 shows three clusters 158, 160, 162 that might be identified for the program call graph 130. Cluster 158 comprises the nodes A, B, C, D, and E. Cluster 160 comprises the nodes D and E. Cluster 162 comprises the nodes C, F, G, and I. Note that nodes D and C are cluster root nodes that are themselves part of cluster 158. Node A is the root node for cluster 158.

Spill Optimization Algorithms

Input: A call graph G of 'n' nodes. It is assumed that the representation of the call graph allows easy identification of a node's successors & predecessors.

Output: Register sets MSPILL, CALLEE_SAVES, CALLER_SAVES, and FREE for each node of G to be used by the register allocator. This information is stored in the program database 56.

The following data structures are used to help identify clusters.

Data Structures visited [1..n]

Flag to mark a node as having been examined.

dom [1..n]

For each node i, dom[i] represents the set of nodes that dominate it.

cluster [1..n]

For each ROOT node i, cluster[i] lists the set of associated cluster nodes.

AVAIL [1..n]

For each node i, AVAIL[i] represents a set of registers that will be used in the register preallocation process.

```
for each web w of each global variable g do {
    if (Web_Table[w].reg ≠ 0) then {
        for each node i in Web_Table[w].nodes do {
            R_Action [i,g] := { 1 };
            if (i ∈ Web_Table[2].Entry_nodes) then
                R_Action [i,g] :=
                    R_Action[i,g] ∪ { 2 };
            if ( g ∈ L_REF[i] ) then
                R_Action [i,g] :=
                    R_action[i,g] ∪ { 3 };
        }
    }
}
```

Pseudo-code:

```
register_preallocation( G )
    {
    /* G is a call graph */

Identify_Clusters( );

Initialize the MSPILL and FREE sets at all nodes in G
    to be empty;

Initialize the CALLEE_SAVES and CALLER_SAVES sets at
    each node to the standard procedure call register sets;

Initialize visited[*] := false;

for each cluster root node P in G in depth first order do
            {
            /* don't allow recursive calls back to the root */
            if any of immediate predecessor of P is an element
                of the cluster rooted at P then
                continue;

Make a pre-pass over the cluster to see which
            registers are used for global variables and to
            determine which registers are used by clusters
            below this one;

AVAILABLE_REGS := CALLEE_SAVES[P] -
                (global interprocedural regs used in cluster);

Assign priorities to the registers based on which
            registers are used by clusters whose roots are
```

```
        members of this cluster.  Registers not used by these
 5      child clusters have  highest priority;

/* USED is a global set of registers */
        USED := Get_Regs_From_Set( P, AVAILABLE_REGS );

10      /*
         * USED is now the set of callee-saves registers
         * needed by the root node itself.
         */
        AVAIL[P] := AVAILABLE_REGS - USED;
15
        CALLEE_SAVES[P] := USED;

Prealloc_Node ( P );

20      MSPILL[P] := USED;

if P is a member of another cluster then
            visited[P] := false;

25      for each node Q in the cluster do
            if Q is not a cluster root then
            {
              /*
                Move into CALLER_SAVES any segments that are
30              currently in AVAIL, as long as they are
                also in MSPILL at the root node of the
                cluster.
              */
              CALLER_SAVES[Q] := AVAIL[Q] ∩ MSPILL[P];
35            MSPILL[Q] := ∅ ;
            }
        }
    }
```

```
Identify_Clusters ()
{
    compute dom[i] set for all nodes of G;

Calc_clusters ();
}

Calc_clusters ()
{
    set visited[i] to false at all nodes of G;

set cluster[i] to Ø at all nodes of G;

for each start node S do {
        Examine_node( S , NULL );
    }
}

Examine_node( P, CurClusterRoot )
{
  /*
   * EXTERNAL_NODE(P) is true for any node P which
   * is not included in the source code of the application.
   */
  if (EXTERNAL_NODE(P) || postpone_visit(P))
      return;

visited(P) := true;

if ( CurClusterRoot != NULL &&
       All predecessors of P have been visited &&
       CurClusterRoot dominates P &&
       All predecessors of P are in the cluster
       rooted at CurClusterRoot )
  then {
```

```
            add node P to the cluster rooted at CurClusterRoot ;
        } if (Is_A_Root( P )) then {
            Create a cluster rooted at P;
            CurClusterRoot := P;
        } for each successor S of P do {
            if (!visited(S))
                Examine_node( S, CurClusterRoot );
        }
    }

BOOLEAN postpone_visit( S )
    {
    /*
    This function will return false if either
            a) all predecessors of S have been visited
                - OR -
            b) Incoming edges from all predecessors nodes
               that haven't been visited are BACK edges.

Conversely, this function will return true if
            a) Not all predecessors of S have been visited
                - AND -
            b) there exists at least one unvisited predecessor
               P, and the edge from P to S is not a BACK edge
               in the graph (i.e.  it's a FORWARD edge, CROSS
               edge, or TREE edge).

This function is defined for two reasons.  First,
    visiting a node should be delayed if not all of it's
    predecessors have been visited yet.  Second, even if
    not all predecessors have been visited, there are cases
``` where one must select some node to visit (or else there
will be a deadlock situation.) This happens when the
incoming edges to S are "back edges" (edges from
descendents of S.)

See the discussion below for an example of why this is
necessary.

*/
}

Is_A_Root (i)
{

Return true if should be a root node, false otherwise.
This is a heuristic based on the incoming and
outgoing calls at node i. If available and selected by
the user, use profile information to get accurate counts
of incoming and outgoing call counts at node i.

}

Get_Regs_From_Set( P, REGS )
{

Let N be the number of callee-saves registers
requested for procedure P.

This function selects up to N registers from the set
REGS, using the priority determined in the prepass to
determine in what order the elements should be selected.

The function returns the set of registers that were
selected. Note that the result set could be empty.
}

```
Prealloc_Node( P )
{ visited[P] := true;

TEMP := the intersection of the AVAIL sets over all
          immediate predecessors of P.
  /* TEMP is now the set of register segments that
     are guaranteed not to hold live values on entry to P.
   */ if (P is the root of a cluster) then
      {
      /*
          First, try to move any registers that are in
          MSPILL[P] into the MSPILL of the current cluster
          root.  Then, try to move any registers that are in
          CALLEE_SAVES[P] into the FREE[P] if possible.
       */
      USED := USED ∪ ( MSPILL[P] ∩ TEMP ) ;
      MSPILL[P] := MSPILL[P] - TEMP;
      USED := USED ∪ ( CALLEE_SAVES[P] ∩ TEMP ) ;
      FREE[P] := CALLEE_SAVES[P] ∩ TEMP ;
      CALLEE_SAVES[P] := CALLEE_SAVES[P] - FREE[P] ;
      }
  else
      {
      FREE[P] := Get_Regs_From_Set( P, TEMP ) ;

AVAIL[P] := TEMP - FREE[P] ;

CALLEE_SAVES[P] := CALLEE_SAVES[P] -
                          (FREE[P] ∪ AVAIL[P]) ;

USED := USED ∪ FREE[P] ;
```

An Example

Consider the sample cell graph 170 shown in FIG. 8. The nodes of this sample call graph are interconnected by directional edges 180, 182, 184, 186, 188, 190. Assume that the depth-first search order of the nodes of this call graph is J, K, L, M, N, P. The depth-first search order is the order in which these nodes are first considered by the algorithm.

Suppose that the function Is_A_Root( ) returns true for nodes J and M. After visiting node J, Examine_node( ) will be called on node K. At this point, however, the decision on whether or not to add node K to the cluster rooted at node J will be postponed. This is because node P has not yet been visited.

If node K is added to the cluster rooted at J, and P is added to the cluster roted at M, condition [2] from the cluster definition will be violated. (Note K will have an immediate predecessor not in its cluster.)

The invention is practiced as follows:

Summary files 48, 50, 52 are produced for each of the source files 18, 20, 22. The program analyzer 54 is invoked specifying the names of the summary files as command line options. The program analyzer 54 reads each of the summary files, constructs the program call graph 130, computes register actions need to do global variable promotion and the register sets (MSPILL, FREE, CALLER_SAVES, CALLEE_SAVES) for spill code motion and finally writes these register actions and register sets out to the program database 56.

The program analyzer 54 performs global register promotion and register spill optimization independently. Interprocedural registers reserved for global promotion are not available for pre-allocation.

After the program database 56 is created, the intermediate files (or the source files) are read by the compiler second phase 12B along with the record of register actions and register sets from the program database for each procedure being compiled. The register actions are then applied to each procedure by the register allocator 62 and object files 120 are created. The object files 120 thus created are read by the program linker 17 linked with the run-time libraries 19 to produce an executable file 24 with interprocedural register allocations.

File Structure

The logical structure of the summary files is described below using Backus Normal Format (BNF) notation.

```
<Summary_File> ::= <Procedure_Record> *
<Procedure_Record> ::=
                Procedure_Name                  +
                Num_Callee_Regs_Needed          +
                <Callee_Info_Record>*           +
                <Global_Usage_Info_Record>*     +
                <Plabel_Record>*
<Callee_Info_Record> ::=
                Callee_Name                     +
                Static_Call_Count
<Global_Usage_Info_Record>::=
                Global_Variable_Name            +
                Global_Attributes               +
                Weighted_Reference_Count        +
                Num_References                  +
<Global_Attributes> ::=
                Global_Type                     |
                Static_Variable?                |
                Address_Taken?
<Plabel_Record> ::= Indirectly_callable_procedure_name
```

The variable usage analyzer 40 computes the Global_Usage_Info_Record. The procedure call analyzer 44 computes the Callee_Info_Record and Plabel_Record. The register need analyzer computes the Num_Callee_Regs_Needed field of the Procedure_Record. Finally, the summary file generator 46 organizes the all the fields of Procedure_Record and writes it out to the summary file 48, 50, 52 of the corresponding source code file 18, 20, 22.

The logical structure of the program database file is described below using the same BNF notation.

| | | |
|---|---|---|
| <Database_File> | ::= <Procedure_Record>* | |
| <Procedure_Record> | ::= <Register_Set> | + |
| | <Reg_Action_Record> | |
| <Register_Set> ::= | MSPILL | + |
| | FREE | + |
| | CALLER_SAVES | + |
| | CALLEE_SAVES | |
| <Reg_Action_Record> ::= | Reg_Action [1..3] | + |
| | Global_Name | + |
| | Interprocedural Register | |

The invention has now been described with respect to specific embodiments. Other embodiments will be apparent to those of ordinary skill in this art upon reference to this description. It is therefore not intended that this invention be limited, except as limited by the appended claims.

What is claimed is:

1. A method for optimizing register usage in an executable computer program on a computer processor having a limited plurality of machine registers, said computer program being compiled from a plurality of individual source code files, said method comprising the steps of:

reading said individual source code files having high-level program language text reciting a plurality of procedures, said source code files being read one at a time; determining syntactic and semantic correctness of each said source code file;

translating each said source code file into an intermediate representation and generating therefrom an intermediate representation file;

collecting local information about usage of global variables from each said source code file, wherein a global variable is a named storage location the contents of which can be stored in a single machine register and is accessible from a plurality of procedures;

estimating need of registers for each procedure from each said intermediate representation; and constructing a record of said register need and said global variable usage and calls to procedures for each procedure in a summary file for each said source code file.

2. The method according to claim 1 further including the steps of:

computing, in a program analyzer, interprocedural register allocation optimization (IRAO) information from all said summary files to be carried out as transformations by subsequent compiler processes; and storing said IRAO information in a program database file for use by said subsequent compiler processes.

3. The method according to claim 2 further including the steps of:

generating profile information about execution of said computer program from a previous compilation of said source code files and execution of said computer program by determining frequency of execution of at least said procedures; and supplying said profile information to said program analyzer to aid in the said computing of said IRAO information.

4. The method according to claim 2 further including the steps of:

transforming each said intermediate representation file into a sequence of machine instructions for each said procedure, each said sequence of machine instructions employing an plurality of pseudo-registers; and implementing intraprocedural register allocation and interprocedural register allocation optimization on said sequence of machine instructions and based on said IRAO information accessed from said program database file.

5. The method according to claim 4 wherein said IRAO information computing step includes partitioning said machine registers between interprocedural registers and intraprocedural registers and wherein said implementing step comprises the steps of:

mapping first selected ones of said pseudo-registers into said limited plurality of said intraprocedural machine registers; and mapping second selected ones of said pseudo-registers into said limited plurality of said interprocedural machine registers in accordance with said IRAO information.

6. The method according to claim 2 wherein said computing step of the program analyzer comprises:

constructing a program call graph (PCG) from all said records, said PCG comprising a set of nodes, each one of said nodes representing one of said procedures interconnected by directional edges, each said directional edge representing a call from a first procedure to a second procedure;

creating webs on said PCG for selected ones of said global variables, wherein a web for a single global variable is a collection of said nodes such that said global variable is accessed in at least one node of said web and such that for each node in said web, said global variable is not accessed in any ancestor node not in said web, and said global variable is not accessed by any descendant node not in said web, and wherein a plurality of webs may be created for a single global variable;

prioritizing said webs according to frequency of use of said global variable within nodes of said web;

assigning a first available one of said machine registers as an interprocedural machine register to first selected ones of said webs according to said prioritizing step, wherein no two of said selected webs having a node in common can be assigned the same machine register; and assigning further available ones of said machine registers as interprocedural machine registers to further selected ones of said webs according to said prioritizing step until all of said available ones of machine registers are assigned or until all selected ones of said webs have been assigned an available machine register.

7. The method according to claim 2 wherein said computing step of the program analyzer comprises:

constructing a program call graph (PCG) from all said records, said PCG comprising a set of nodes, each one of said nodes representing one of said procedures interconnected by directional edges, each said directional edge representing a call from a first procedure to a second procedure;

creating clusters on said PCG, wherein a cluster is a collection of said nodes such that there exists a unique root node of said cluster only through which every other node in said cluster can be called, to obtain a cluster organization;

partitioning, for each said cluster, said machine registers into interprocedural registers and intraprocedural registers for each of the said nodes within said clusters according to said register need and as restricted by said cluster organization; and designating, for each said cluster, that a cluster root node execute machine instructions to preserve values of said interprocedural registers used within said cluster upon calls to said cluster root node so that other nodes within said cluster need not execute said machine instructions.

8. The method according to claim 6 wherein said computing step of the program analyzer comprises:

constructing a program call graph (PCG) from all said records, said PCG comprising a set of nodes, each one of said nodes representing one of said procedures interconnected by directional edges, each said directional edge representing a call from a first procedure to a second procedure;

creating clusters on said PCG, wherein a cluster is a collection of said nodes such that there exists a unique root node of said cluster only through which every other node in said cluster can be called, to obtain a cluster organization;

partitioning, for each said cluster, said machine registers into interprocedural registers and intraprocedural registers for each of the said nodes within said clusters according to said register need and as restricted by said cluster organization; and designating, for each said cluster, that said cluster root node execute machine instructions to preserve the values of said interprocedural registers used within said cluster upon calls to said cluster root node so that other nodes within said cluster need not execute said machine instructions.

9. A method for optimizing register usage in an executable computer program on a computer processor having a limited plurality of machine registers, said computer program being compiled from a plurality of individual source code files, said method comprising the steps of:

reading said individual source code files having high-level program language text reciting a plurality of procedures, said source code files being read one at a time;

determining syntactic and semantic correctness of each said source code file;

translating each said source code file into an intermediate representation;

collecting local information about usage of global variables from each said source code file, wherein a global variable is a named storage location the contents of which can be stored in a single machine register and is accessible from a plurality of procedures;

estimating need of registers for each procedure from each said intermediate representation; and constructing a record of said register need and said global variable usage and calls to procedures for each procedure in a summary file for each said source code file.

10. The method according to claim 9 further including the steps of:

transforming each said source file into a sequence of machine instructions for each said procedure, each said sequence of machine instructions employing a plurality of pseudo-registers; and implementing intraprocedural register allocation and interprocedural register allocation optimization on said sequence of machine instructions and based on said IRAO information accessed from said program database file.

11. An apparatus for optimizing register usage in an executable computer program on a computer processor having a limited plurality of machine registers, said computer program being compiled from a plurality of individual source code files, said apparatus comprising:

means for reading said individual source code files having high-level program language text reciting a plurality of procedures, said source code files being read one at a time;

means coupled to said reading means for determining syntactic and semantic correctness of each said source code file;

means coupled to said determining means for translating each said source code file into an intermediate representation and generating therefrom an intermediate representation file;

means coupled to said translating means for collecting local information about usage of global variables from each said source code file, wherein a global variable is a named storage location the contents of which can be stored in a single machine register and is accessible from a plurality of procedures;

means coupled to said collecting means for estimating need of registers for each procedure from each said intermediate representation; and means coupled to said estimating means, to said collecting means, and to said translating means for constructing a record of said register need and said global variable usage and calls to procedures for each procedure in a summary file for each said source code file.

12. An apparatus for optimizing register usage in an executable computer program on a computer processor having a limited plurality of machine registers, said computer program being compiled from a plurality of individual source code files, said apparatus comprising:

means for reading said individual source code files having high-level program language text reciting a plurality of procedures, said source code files being read one at a time;

means coupled to said reading means for determining syntactic and semantic correctness of each said source code file;

means coupled to said determining means for translating each said source code file into an intermediate representation;

means coupled to said translating means for collecting local information about usage of global variables from each said source code file, wherein a global variable is a named storage location the contents of which can be stored in a single machine register and is accessible from a plurality of procedures;

means coupled to said collecting means for estimating need of registers for each procedure from each said intermediate representation; and means coupled to said estimating means, to said collecting means, and to said translating means for constructing a record of said register need and said global variable usage and calls to procedures for each procedure in a summary file for each said source code file.

13. The apparatus according to claim 12 further comprising:

a program analyzer means for computing interprocedural register allocation optimization (IRAO) information from all said summary files to be carried out as transformations by subsequent compiler processes; and means for storing said IRAO information in a program database file for use by said subsequent compiler processes.

14. The apparatus according to claim 13 further comprising:

means for transforming each said source code file into a sequence of machine instructions for each said procedure, each said sequence of machine instructions employing a plurality of pseudo-registers; and means coupled to said transforming means for implementing intraprocedural register allocation and interprocedural register allocation optimization on said sequence of machine instructions and based on said IRAO information accessed from said program database file.

15. A method of operating a general purpose data processor having a plurality of machine registers, a sub-set thereof being assigned for use as interprocedural registers, so as to allow more efficient allocation of said procedural registers when said data processor is executing a computer program comprising a plurality of procedures, at least one of said procedures operating on a global variable, said method comprising the steps of:

building a program call graph, said program call graph comprising a set of nodes, each said node representing a procedure, interconnected by directional edges to other said nodes, each said edge representing a call from a first procedure to a second procedure, the node representing said first procedure being the ancestor of the node representing said second procedure and the node representing said second node being the descendent of the node representing said first procedure;

defining webs corresponding to global variables, each said web corresponding to a global variable, each said web comprising a collection of program call graph nodes such that said corresponding global variable is accessed in at least one node in said web and such that, for each node in said web, said corresponding global variable is not accessed in any ancestor node not in said web, and said global variable is not accessed by an descendant node not in said web;

determining the order for said webs; and assigning said global variables to interprocedural machine registers according to the order of said webs corresponding to said global variables in said determined order, wherein said selected global variables comprise said global variables are eligible for assignment to an interprocedural machine register.

16. A method of operating a general purpose data processor having a plurality of machine register, a sub-set thereof being assigned for use as interprocedural registers, so as to allow more efficient allocation of said interprocedural registers when said data processor is executing a computer program comprising a plurality of procedures, at least one of said procedures operating on a global variable, said method comprising the steps of:

building a program call graph, said program call graph comprising a set of nodes, each said node representing a procedure, interconnected by directional edges to other said nodes, each said edge representing a call from a first procedure to a second procedure, the node representing said first procedure being the ancestor of the node representing said second procedure and the node representing said second node being the descendent of the node representing said first procedure;

defining webs corresponding to global variables, each said web corresponding to a global variable, each said web comprising a collection of program call graph nodes such that said corresponding global variable is accessed in at least one node in said web and such that, for each node in said web, said corresponding global variable is not accessed in any ancestor node not in said web, and said global variable is not accessed by an descendant node not in said web;

determining the order for said webs; and assigning said global variables to interprocedural machine registers according to the order of said webs corresponding to said global variables in said determined order, wherein said order determined for said webs is determined by the frequency of use of the global variable corresponding to each said web.

17. A method of operating a general purpose data processor having a plurality of machine register, a sub-set thereof being assigned for use as interprocedural registers, so as to allow more efficient allocation of said interprocedural registers when said data processor is executing a computer program comprising a plurality of procedures, at least one of said procedures operating on a global variable, said method comprising the steps of:

building a program call graph, said program call graph comprising a set of nodes, each said node representing a procedure, interconnected by directional edges to other said nodes, each said edge representing a call from a first procedure to a second procedure, the node representing said first procedure being the ancestor of the node representing said second procedure and the node representing said second node being the descendent of the node representing said first procedure;

defining webs corresponding to global variables, each said web corresponding to a global variable, each said web comprising a collection of program call graph nodes such that said corresponding global variable is accessed in at least one node in said web and such that, for each node in said web, said corresponding global variable is not accessed in any ancestor node not in said web, and said global variable is not accessed by an descendant node not in said web;

determining the order for said webs; and assigning said global variables to interprocedural machine registers according to the order of said webs corresponding to said global variables in said determined order, wherein said order determined for said webs is determined from profile information collected by executing said program with exemplary input data on a data processing system capable of running said program.

18. A method of operating a general purpose data processor having a plurality of machine register, a sub-set thereof being assigned for use as interprocedural registers, so as to allow more efficient allocation of said interprocedural registers when said data processor is executing a computer program comprising a plurality of procedures, at least one of said procedures operating on a global variable, said method comprising the steps of:

building a program call graph, said program call graph comprising a set of nodes, each said node representing a procedure, interconnected by directional edges to other said nodes, each said edge representing a call from a first procedure to a second procedure, the node representing said first procedure being the ancestor of the node representing said second procedure and the node representing said second node being the descendent of the node representing said first procedure;

defining webs corresponding to global variables, each said web corresponding to a global variable, each said web comprising a collections of program call graph nodes such that said corresponding global variable is accessed in at least one node in said web and such that, for each node in said web, said corresponding global variable is not accessed in any ancestor node not in said web, and said global variable is not accessed by an descendant node not in said web;

determining the order for said webs; and assigning said global variables to interprocedural machine registers according to the order of said webs corresponding to said global variables in said determined order, said method further comprising the step of identifying a procedure into which code is to be inserted, said code causing the contents of one of said interprocedural register to be stored in a location in said data processing system different from said interprocedural register upon entry into said procedure thereby freeing said interprocedural register for use in storing a different said global variable.

19. The method of claim 18 wherein said step of identifying a procedure comprises identifying clusters of nodes in said program call graph, each said cluster comprising a set of connected nodes having a root node such that every other node in the cluster can be called through said unique root node.

20. The method of claim 19 wherein said clusters are identified by using profile information collected by executing said program with exemplary input data on a data processing system capable of running said program.

* * * * *